United States Patent [19]
Mehra

[11] Patent Number: 5,994,918
[45] Date of Patent: Nov. 30, 1999

[54] ZERO DELAY REGENERATIVE CIRCUIT FOR NOISE SUPPRESSION ON A COMPUTER DATA BUS

[75] Inventor: Amitabh Mehra, Fort Collins, Colo.

[73] Assignee: Hewlett-Packard Co., Palo Alto, Calif.

[21] Appl. No.: 08/924,720

[22] Filed: Aug. 29, 1997

[51] Int. Cl.[6] .................. H03K 19/003; H03K 19/0175; H03K 19/00
[52] U.S. Cl. ................ 326/30; 326/30; 326/28; 326/90; 326/86; 326/93
[58] Field of Search ................. 326/30, 27, 28, 326/26, 89, 90, 86, 83, 93, 95, 98

[56] References Cited

U.S. PATENT DOCUMENTS

| | | | |
|---|---|---|---|
| 3,946,251 | 3/1976 | Kawagoe | 326/30 |
| 5,166,561 | 11/1992 | Okura | 326/30 |
| 5,179,299 | 1/1993 | Tipon | 326/30 |
| 5,440,182 | 8/1995 | Dobbelaere | 326/83 |
| 5,546,016 | 8/1996 | Allen | 326/30 |

OTHER PUBLICATIONS

Mark N. Horenstein, Microelectronic Circuit & Devices, pp. 753–755, 1990.

*Primary Examiner*—Michael Tokar
*Assistant Examiner*—James H. Cho
*Attorney, Agent, or Firm*—Patrick J. Murphy

[57] ABSTRACT

A novel zero delay regenerative circuit is presented. The circuit, when connected to a data bus, suppresses noise, reduces time delay and provides sharper edge rates. A first input of a NOR gate is connected to an input node. A second input of the NOR gate is connected to the precharge clock of the bus. The output of the NOR gate is connected to the gate terminate of a field-effect transistor (FET). With the drain terminal connected to ground, the source terminal of the FET is connected to an output node. The input and output nodes are shorted together.

5 Claims, 5 Drawing Sheets

ZERO DELAY REGENERATIVE CIRCUIT FOR NOISE SUPPRESSION ON A COMPUTER DATA BUS

FIELD OF THE INVENTION

The present invention relates generally to computer data buses and more particularly to a circuit that, when connected to a data bus, provides noise suppression with zero delay.

BACKGROUND OF THE INVENTION

All computers use a data bus for facilitating communication between the central processing unit, memory and peripherals. In general, the data bus comprises a set of data lines, address lines and control lines. The data lines (and some address and control lines) are bidirectional. These lines can be driven by either three-state devices or open-collector gates with resistor pullups. Resistor pullups may also be necessary with three-state drivers if the bus is physically long.

One problem that is encountered with long buses is that the last device attached to the bus can fall below local ground. When this occurs, the device will drive a logical zero back to the driver when a logical one is expected, indicative of device failure. One way to address this problem is to add an electrical buffer before the last device which would prevent the signal from going below local ground. Unfortunately, the additional buffer adds significant time delay, thus reducing the operating frequency of the overall system. This buffer highlights another problem that crops up on physically long buses; that is, for each device hooked up to the bus, a time delay is introduced. For a long bus, there are many devices that are attached to the bus and, thus, a significant time delay factor associated with that bus.

SUMMARY OF THE INVENTION

The present invention contemplates a zero-delay regenerative circuit that, when connected to a computer data bus, provides noise suppression. The circuit, which comprises an NOR gate in series with a single gate, has its input and output shorted together. Thus, the present circuit eliminates noise without introducing any time delay into the system.

The input node is configured to receive an input signal from the data bus. Connected to this node is a first input of the NOR gate. A second input of the NOR gate is connected to a clock signal. The output of the NOR is connected to the gate terminal of a transistor. The source terminal of the transistor is connected to the output node which is shorted to the input node. The drain terminal is connected to ground. Essentially, when the input signal is high, the transistor can never be turned on. When the input signal is low, the transistor will only be turned on when the clock signal is low.

DETAILED DESCRIPTION OF THE PREFERRED EMBODIMENT

Briefly, the present invention provides a very simple and elegant solution to the problem of precharged data buses that suffer from the problem of falling below the local ground of a receive circuit during pull-down operation. The present circuit has two operational modes, a first mode during evaluation of the input signal and a second mode during non-evaluation. During the second mode, the circuit shuts off its output. During the first mode (i.e., evaluation of the input), the circuit senses a falling edge of the input signal. Once the falling edge is sensed, the circuit turns on and drives the input to local ground. In that manner, the data bus is never pulled down below the local ground.

Figure 1:
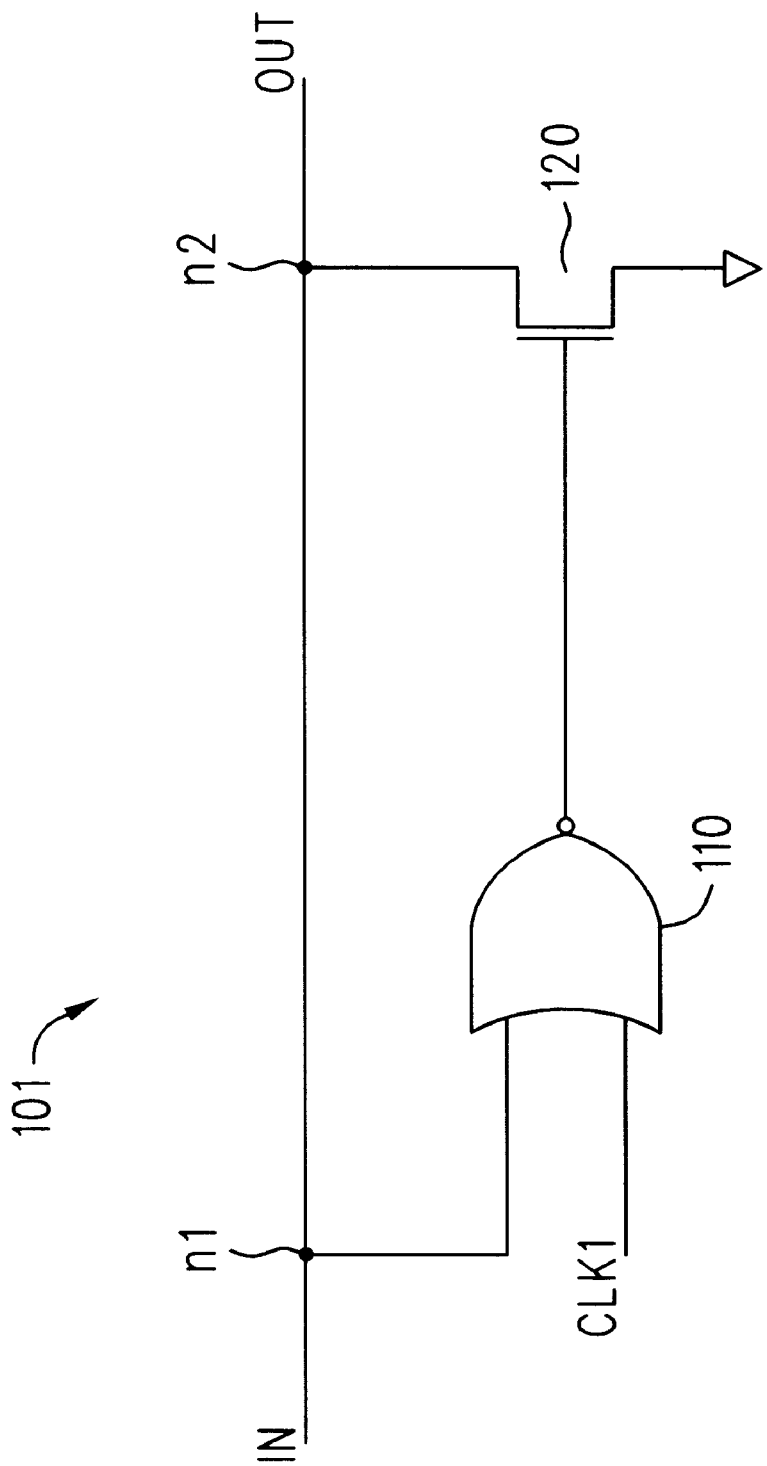
FIG. 1 shows a first circuit diagram of the present invention.

FIG. 1 shows a first circuit diagram of the present invention. The circuit 101 comprises a NOR gate 110 and transistor 120, which are both disposed between input and output nodes. As is clearly evident from FIG. 1, the input node, n1, is shorted to the output node, n2—this is a feature of the present invention. With the input and output nodes shorted together, the present circuit eliminates noise without introducing any time delay into the system.

A first input of the NOR gate 110 is connected to the input node, n1. A second input of the NOR gate 110 is connected to CLK1, which in a preferred embodiment is the precharge clock signal for the data bus in the present invention. The output of the NOR gate 110 is connected to the gate terminal of transistor 120. In a preferred embodiment, transistor 120 is a field effect transistor (FET). The source terminal of FET 120 is connected to the output node, n2, while the drain terminal of FET 120 is connected to ground.

The operation of this circuit is as follows. When either of the inputs is a logical 1, the output of the NOR 110 is low; when both of the inputs are logical zero, the output of the NOR 110 is high. Thus it can be seen that when the input signal is high, FET 120 can never be turned on. When the input is low, FET 120 will only be turned on when CLK1 is low. Since CLK1 is the precharge clock signal for the data bus, the non-evaluate mode occurs when CLK1 is high, evaluate mode when CLK1 is low.

Figure 2:
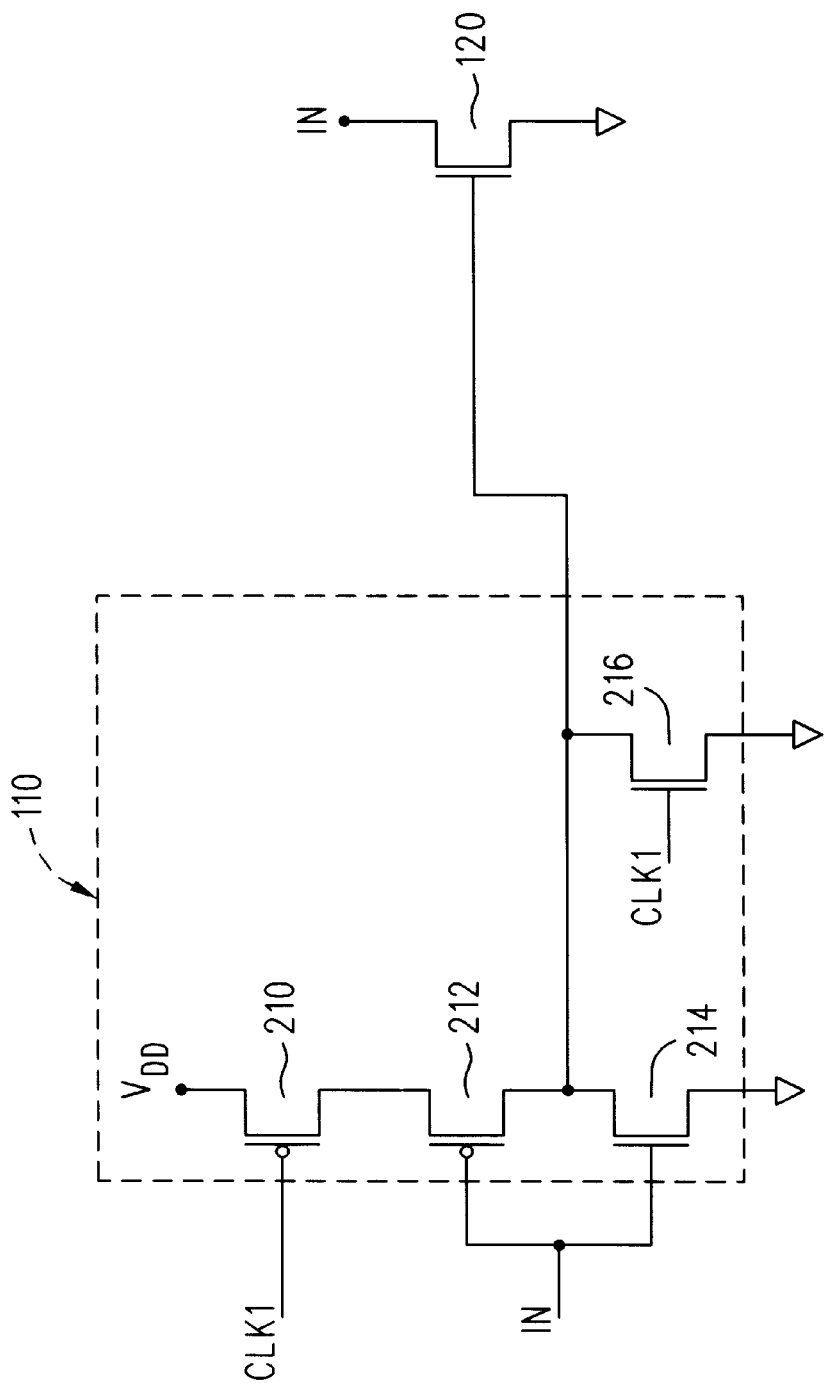
FIG. 2 shows a second circuit diagram of the present invention.

FIG. 2 shows a second circuit diagram according to the present invention. The NOR gate 110 is realized with four FETs 210, 212, 214, 216. CLK1 is connected to the gate terminals of FETs 210 and 216 (note that FET 210 has an inverter connected to the gate terminal as well).

The source terminal of FET 210 is connected to $V_{DD}$, nominally 3.3 volts. The drain terminal of FET 210 is connected to the source terminal of FET 212. The input node is connected to both gate terminals of FETs 212 and 214. The drain terminal of FET 212 is connected to the source terminal of FET 214, which in turn is connected to the source terminal of FET 216 and the gate terminal of FET 120. The drain terminals of FETs 214, 216 and 120 are all connected to ground. When the precharge clock goes high (i.e., the system is in the non-evaluate mode), FET 210 is off, while FET 216 turns on, essentially turning the circuit off. When the precharge clock goes low (i.e., the system is in the evaluate mode), FET 210 is on, FET 216 is off, and the circuit drives the input to ground as the FETs 212 and 214 detect the falling edge of the input signal.

Figure 3:
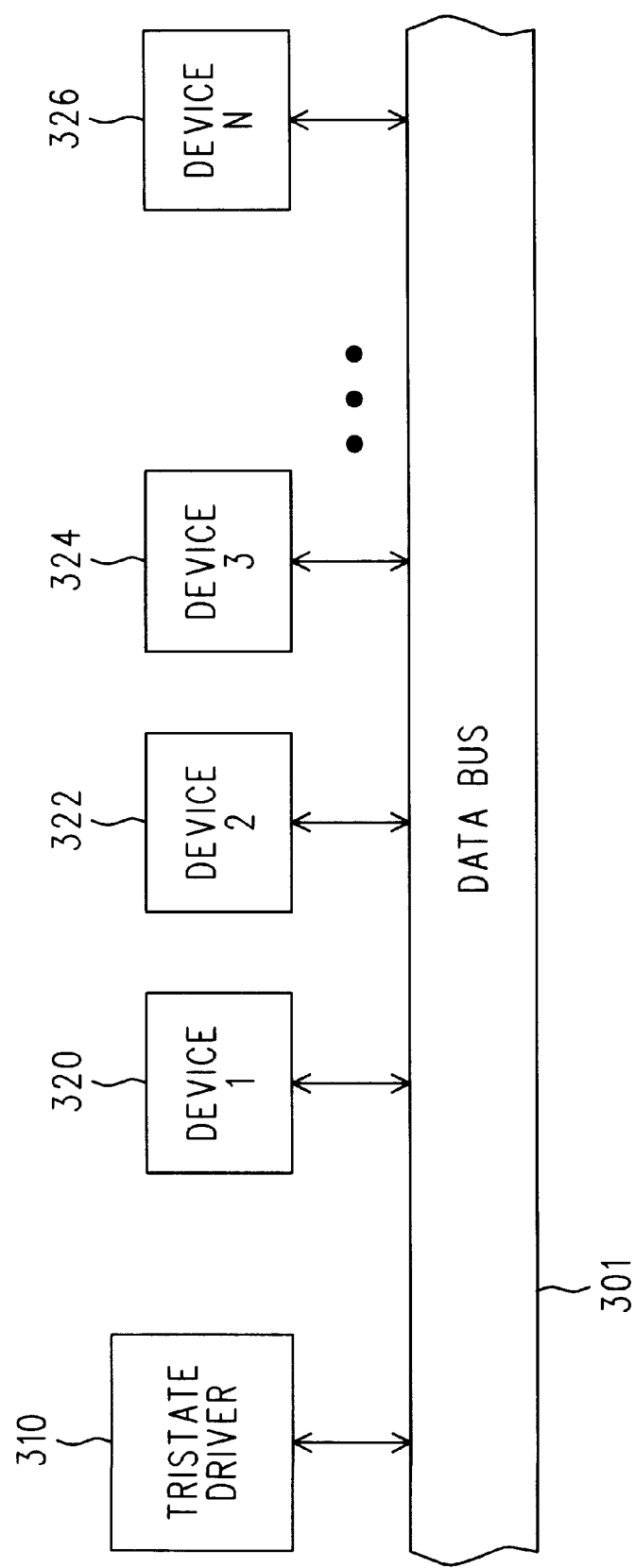
FIG. 3 shows a block diagram of a computer system incorporating the present invention.

FIG. 3 shows a block diagram of a computer system incorporating the present invention. Data bus 301 is physically long. In a preferred embodiment, bus 301 is a precharged, pull-down bus. Multiple devices are attached to the bus, 1 through N (items 320, 322, 324 and 326). Device N is the last device physically attached to the bus. A three-state driver 310 drives the bus.

Figure 4:
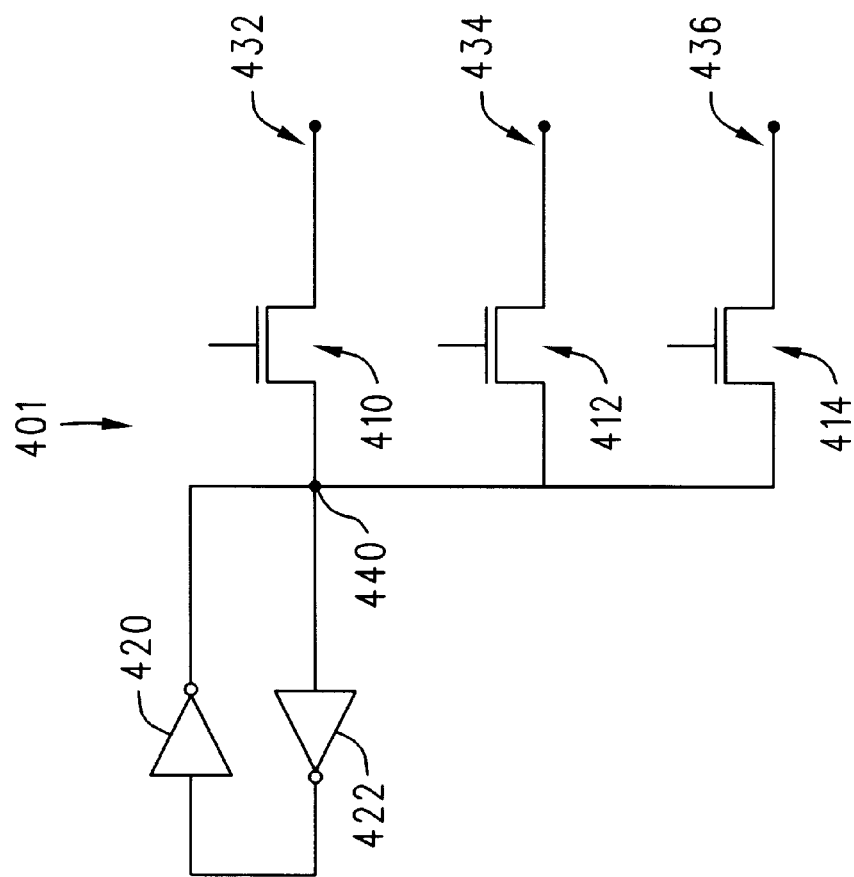
FIG. 4 shows one embodiment of a device which is the last device attached to the data bus of the computer system in FIG. 3.

FIG. 4 shows one embodiment of a device which is the last device (i.e., Device N, item 326) attached to the data bus of the computer system in FIG. 3. This is a conventional three-input latch. For purposes of discussion, the node of interest is node 432. When node 432 is high, we expect to see a logical one back at the three-state driver 310. The problem occurs when either or both gates 412 and 414 are low, and in fact are lower than the threshold voltages for these gates such that they override the logical 1 at node 440. Thus, driver circuit sees a logical zero when it expects a logical one and the last device 326 appears to have failed. With the circuit of FIG. 1 (or FIG. 2) connected to the input nodes of circuit 401 (i.e., nodes 432, 434 and 436), this failure problem is solved since it is impossible for device N (item 326) to fall below local ground. Furthermore, with circuit 101 connected at the inputs of all of the devices attached to the bus 301, the inventor has found that the overall time delay of the system is reduced significantly (on the order of 100–200 picoseconds). Additionally, the edge rate at the receiver (i.e., the last device N, item 326) is significantly sharper as well. The inventor has observed that the edge rate is on the order of 300–400 picoseconds (conventional edge rates are on the order of 1 nanosecond).

Figure 5:
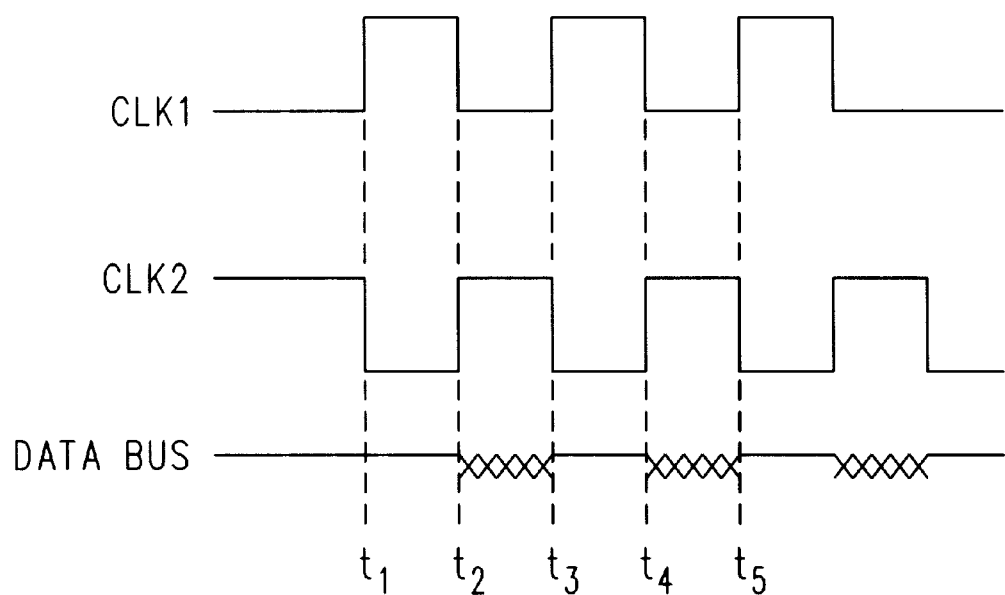
FIG. 5 shows a timing diagram of the circuits in FIGS. 1 and 2 according to the present invention.

FIG. 5 shows a timing diagram of the circuits in FIGS. 1 and 2 according to the present invention. CLK1 represents the data bus' precharge clock signal, CLK2 is the inverse of the precharge clock, or "evaluate clock" signal. As evident from the figure, evaluate times occur between $t_2$ and $t_3$, and between $t_4$ and $t_5$.

While the present invention has been illustrated and described in connection with the preferred embodiments, it is not to be limited to the particular structures shown. It should be understood by those skilled in the art that various changes and modifications may be made within the purview of the appended claims without departing from the true scope and spirit of the invention in its broader aspects.

I claim:

1. A circuit for providing noise suppression on a computer data bus, the circuit comprising:

a NOR gate having an output and first and second inputs, the first input connected to an input node of the data bus, the input node configured to receive an input signal, the second input connected to a clock signal; and a transistor having a gate terminal, a source terminal and a drain terminal, the gate terminal connected to the output of the NOR gate, the source terminal connected to an output node of the data bus, the drain terminal connected to ground, wherein the input node and output node are shorted together and thus the data bus is never pulled down below ground.

2. The circuit of claim 1, wherein the clock signal is a precharge clock of the data bus.

3. The circuit of claim 2, wherein the transistor is a field-effect transistor.

4. The circuit of claim 3, wherein the input signal is driven to ground when the input signal is a logical zero and the clock signal is a logical zero.

5. A zero-delay regenerative circuit for noise suppression on a computer data bus, the circuit comprising:

a first transistor having a first gate terminal, a first source terminal and a first drain terminal, the first gate terminal connected to a clock signal, the first source terminal connected to $V_{DD}$;

a second transistor having a second gate terminal, a second source terminal and a second drain terminal, the second source terminal connected to the first drain terminal, the second gate terminal connected to an input node, the input node configured to receive an input signal;

a third transistor having a third gate terminal, a third source terminal and a third drain terminal, the third source terminal connected to the second drain terminal, the third gate terminal connected to the second gate terminal;

a fourth transistor having a fourth gate terminal, a fourth source terminal and a fourth drain terminal, the fourth source terminal connected to the third source terminal, the fourth gate terminal connected to the first gate terminal, the fourth drain terminal connected to ground; and a fifth transistor having a fifth gate terminal, a fifth source terminal and a fifth drain terminal, the fifth gate terminal connected to the fourth source terminal, the fifth source terminal connected to the input node, the fifth drain terminal connected to ground, wherein the input signal is driven to ground when the input signal and the clock signal are both logical zero.

* * * * *